May 28, 1968 — M. LAUNDER ETAL — 3,385,266

MANURE HANDLING SYSTEM FOR ANIMAL HOUSE

Filed Oct. 31, 1966 — 4 Sheets-Sheet 1

*INVENTORS*
MARK LAUNDER
ROBERT M. LASALLE, JR.
BY
Hood, Gust & Irish
ATTORNEYS

May 28, 1968  M. LAUNDER ETAL  3,385,266

MANURE HANDLING SYSTEM FOR ANIMAL HOUSE

Filed Oct. 31, 1966  4 Sheets-Sheet 4

INVENTORS
MARK LAUNDER
ROBERT M. LASALLE, JR.
BY
Hood, Gust & Irish
ATTORNEYS

United States Patent Office 3,385,266
Patented May 28, 1968

3,385,266
MANURE HANDLING SYSTEM FOR
ANIMAL HOUSE
Mark Launder and Robert M. La Salle, Jr., Wabash, Ind.,
assignors to Horizons Unlimited—Problems Solved by
Ideas Corporation, Wabash, Ind., a corporation of
Indiana
Filed Oct. 31, 1966, Ser. No. 590,997
14 Claims. (Cl. 119—22)

The present invention relates to a manure handling system for animal houses and is particularly directed to such a system in which droppings from confined creatures fall upon a moving, disposable strip, means being provided for automatically moving such strip past the region of animal confinement and preferably feeding the burdened strip to treatment apparatus wherein the physical character of the burdened strip is so changed as to produce a valuable fertilizer in such form as to be readily handled and used.

The primary object of the invention, then, is to provide an installation or system which will accomplish the above functions. A further object of the invention is to provide, in such a system, air-moving means establishing an air flow which is of such character as efficiently to dry the animal droppings before the moving strip is fed to the treatment means.

Still a further object of the invention is to design the air-moving means of such a system so that the aforementioned moving strip substantially floats upon an air cushion, whereby frictional resistance to its movement, and consequently its liability to rupture, will be minimized.

Still further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

While it will be apparent that embodiments of the present invention will find utility in any installation in which relatively large numbers of animals of any kind are confined against free movement, we have applied the invention in a chicken house, and it has therefore been illustrated, and will be described, in that environment.

Figure 1:
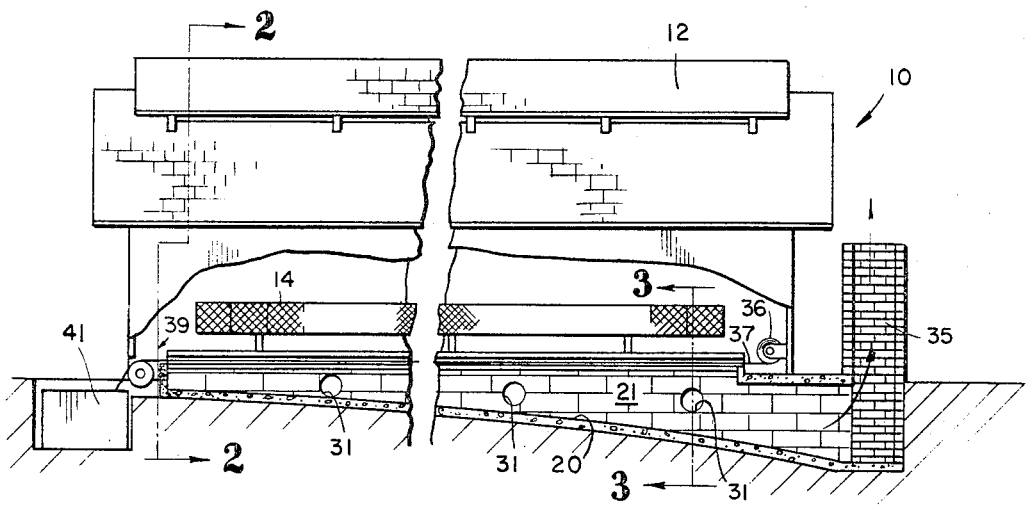
FIG. 1 is a somewhat diagrammatic illustration of an animal house embodying one form of our invention, parts being broken away for clarity of illustration.
Figure 2:
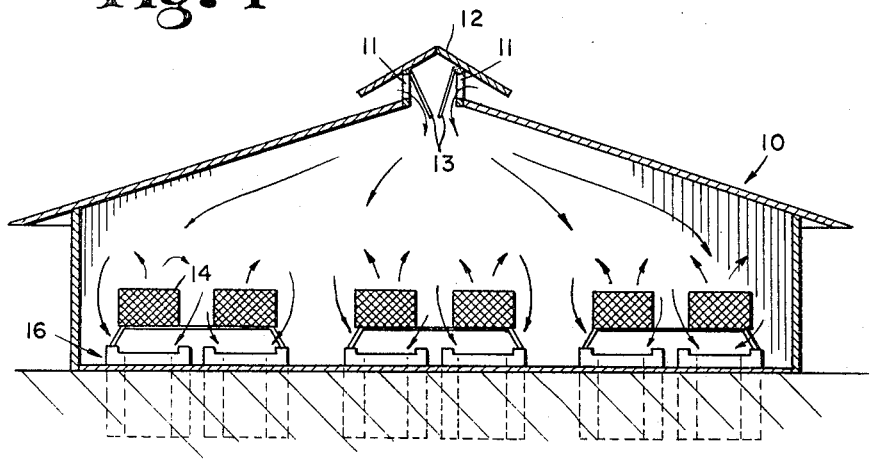
FIG. 2 is a transverse section, drawn to an enlarged scale, and taken substantially on the line 2—2 of FIG. 1.

Referring more particularly to the drawings, it will be seen that in FIGS. 1 and 2 we have illustrated a house or building 10 provided with controlled air inlet ports 11 in its upper regions, said ports being guarded by an overhanging eave structure 12 and being individually controllable by movable shutters or valves 13. Within the house, and in the lower region thereof but suspended in any suitable fashion above the floor thereof, there is arranged a plurality of banks 14 of cage means. Each such bank may consist of a plurality of individual, open work cages arranged in a longitudinal series. The cage floors, like their side walls and roofs, will be foraminous and may preferably be reticulate; and the several cages are suspended by any suitable means of such character that their foraminous floors are not obstructed. As shown, such suspension means comprises rack structure indicated generally by the reference numeral 15, the horizintal elements of which will be in registry with end wall elements of the several cages so that the cage floors are not obstructed thereby. Alternatively, the cages may be suspended from the building roof or from beams by means of cables, chains, rods or the like.

In the illustrated embodiment of the invention, the racks 15 are supported upon masonry or other bases 16 and beneath each bank of cages 14 there is arranged a pair of parallel, upstanding walls 17 and 18 which, together with a roof or top member 19 and a preferably inclined floor 20, define an elongated chamber 21. As will be apparent from inspection of FIG. 1, the length of the chamber 21 is at least equal to the length of its associated bank of cages 14.

The roof 19 of the chamber 21 may be defined by suitable means, to be described hereinafter, and said roof spans, and rests upon, the upper edges of the walls 17 and 18 and is formed with suitably spaced openings for a purpose which will appear. Preferably, and as shown, the roof 19 is so proportioned as to extend laterally beyond said walls as at 23 and 24.

Figure 3:
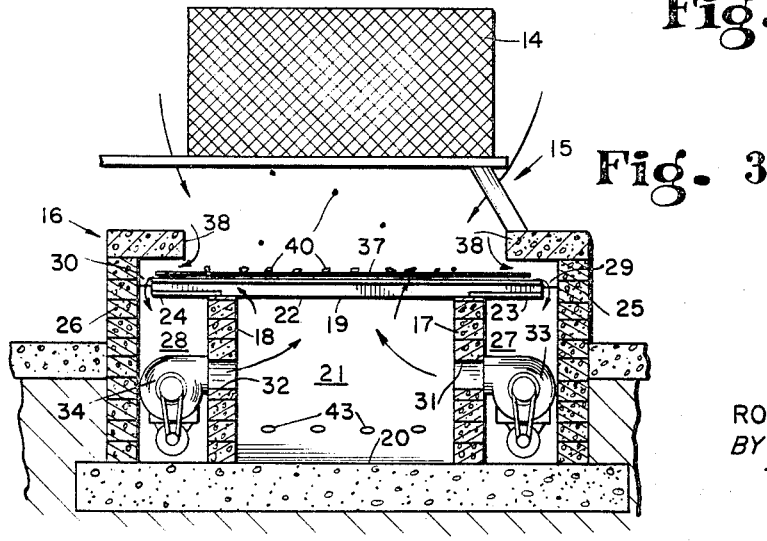
FIG. 3 is a fragmentary, still further enlarged section taken substantially on the line 2—2 of FIG. 1.

As shown in FIG. 3, the base 16 comprises other parallel walls 25 and 26 which are respectively outwardly spaced from the walls 17 and 18 to define auxiliary chambers 27 and 28 oppositely flanking the chamber 21. The roof overhangs 23 and 24 cooperate with the walls 25 and 26 to define inlet ports 29 and 30 opening into the upper portions of the chambers 27 and 28, respectively.

At suitably spaced points in their lengths, the walls 17 and 18 are formed with ports 31 and 32 respectively opening into the chamber 21; and a blower 33 or 34 is provided for each such port, the blowers 33 being disposed in the chamber 27 and the blowers 34 being disposed in the chamber 28. These blowers are of such character and capacity that, when in operation, they will draw air through the ports 29 and 30 and deliver it to the chamber 21 at such a rate as to maintain a superatmospheric pressure within the chamber 21 in spite of the escape of air through the roof openings to be described. As a consequence, during operation of the system, a blast of significant mass and velocity flows constantly upward through the said openings.

In a typical installation, each cage of a bank 14 is proportioned and designed to accommodate five chickens and there may be as many as fifty such cages in each bank. The body heat of the chickens tends to establish a significant upward flow of air through the foraminous floors and roofs of the several cages. This flow to a significant degree prevents any downward draft directly through the cages as a result of the operation of the blowers 33 and 34 tending to draw air downwardly from the ports 11 and through the ports 29 and 30. As a consequence, the fresh air entering through the ports 11 tends to flow around the cage banks and thence beneath the cages to the said ports 29 and 30. Depending upon the setting of the shutters 13, some of the air delivered to the chamber 21 by the said blowers may, at times, escape therefrom through a chimney 35 with which the rear end of the chamber 21 communicates.

A preferred form of pressure chamber roof structure is illustrated in FIGS. 6 to 9. As there shown, the roof comprises alternating right- and left-hand I-beams spanning and supported from the upper edges of walls 17 and 18. Beams 60, 61 and 62 have short terminal sections of their lower, left-hand flanges 63 cut away as at 64 and have long intermediate sections of their lower, right-hand flanges 65 cut away as at 66. Similarly, beams 67, 68 and 69 have short terminal sections of their lower, right-hand flanges 70 cut away as at 71 and have long intermediate sections of their lower, left-hand flanges 72 cut away as at 73. Thus, when a suitable plurality of beams is arranged in alternating succession throughout the length of the walls 17 and 18 and in spanning relation to said walls, an alternating series of transverse cavities is established, the alternate cavities 74, 76 and 78 being in open communication with the pressure chamber 21, and the intermediate cavities 75 and 77 being sealed from said pressure chamber but open, through their bottoms, to the auxiliary chambers 27 and 28. Preferably all of the cavities will be closed at their opposite ends.

The upper flanges of all of the beams will be somewhat narrower than their lower flanges, or narrow spacer means (not shown) may be interposed between the lower flanges of adjacent beams, whereby transversely-extending slots 79, 80, 81, 82, 83, uniformly longitudinally spaced along the roof 19 and opening through the upper surface thereof, will be established.

Adjacent the rear end of chamber 21 there is suitably supported within the house 10 a supply roll 36 of continuous, flexible, substantially air-resistant strip material which must be of such character as to be disposable or expendable and which may preferably be of such character as to have some value as a fertilizer. We presently believe a substantially water proof kraft paper to be the optimum material for such use. The roll 36 is mounted in registry with the roof 19, and a separate roll 36 will preferably be provided for each bank of cages. If more than one bank of cages is spanned by a single strip, the number of birds in the separate banks must be reasonably well balanced to avoid warping of the paper strip resulting from uneven wetting.

When the installation is initially put into use, a strip 37 of such material will be manually withdrawn from the roll 36 to overlie the roof 19 of the associated chamber, and the free end of such withdrawn strip will be fed to motor driven strip-advancing means such as, for instance, the vacuum drum 39 illustrated in FIG. 1. The strip-advancing means will be power driven at a predetermined rate to move the strip material, either continuously or step-by-step, longitudinally of the chamber 21 and so on beyond said chamber. As illustrated in FIG. 1, the strip may preferably be moved on to treatment means located beyond the distal end of the chamber 21 and preferably outside the house 10, as suggested at 41. Thus, fresh strip material is continually withdrawn from the roll 36 and is moved beneath the cage bank 14 to receive droppings 40 from said cages, and such material is ultimately delivered to the treatment means 41 which, we presently believe, may preferably be chopping or grinding mechanism which will comminute the strip material and its burden as such burdened material is fed to the treatment means.

By reason of the construction above described, it will be seen that air under pressure may flow constantly from chamber 21 into alternate cavities 74, 76 and 78 and thence, at accelerated velocity, through alternate slots 79, 81 and 83, which extend substantially throughout the width of the chamber 21, to impinge uniformly upon the lower surface of the strip 37; while air may escape from the region between the roof 19 and the strip 37 through the intermediate slots 80, 82 etc. to return to the auxiliary chambers 27 and 28 and the blower intakes. The parts are so proportioned and designed that, as a result of this air flow, the strip 37 will be floated, substantially uniformly throughout the length of the chamber 21, upon a substantially frictionless air cushion.

The strip 37 moves very slowly, and it is found that, by the time the strip is delivered to the treatment means 41, its burden is sufficiently dry so that, upon comminution, it may be readily handled and packaged for shipment and sale.

At times, and depending upon the temperature and humidity conditions of the outside atmosphere, it may be desirable to close the shutters 13 completely, or almost so. In some instances, it may be desirable, therefore, to provide means 43 for controlling the temperature and humidity conditions of air in chamber 21 in accordance with well understood practices.

Figure 4:
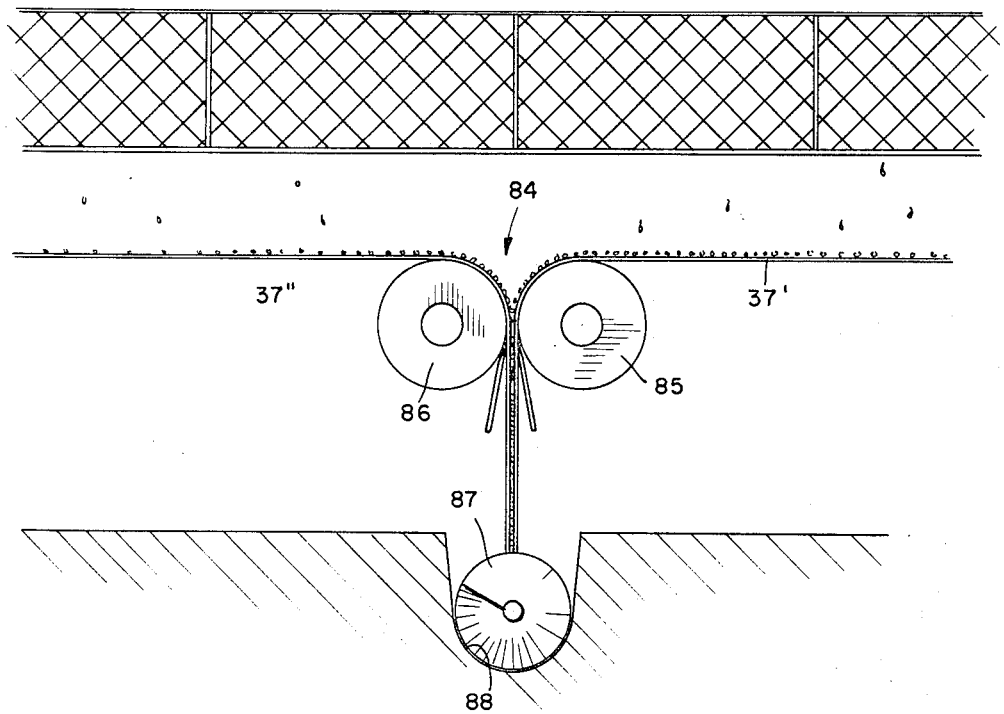
FIG. 4 is a fragmentary side elevation, partly in section, showing a modified form of strip-advancing and disposal means.

In some installations, it may be undesirable to move the strip 37 through the whole length of a bank of cages. In such a case, separate strip-supply rolls may be mounted at opposite ends of a cage bank and strip-advancing means 84 may be disposed at an intermediate point in the length of the bank. As shown in FIG. 4, the means 84 may comprise a pair of driven pinch rolls 85 and 86, the separate strips 37' and 37" being led over and between said rolls to be advanced synchronously in opposite directions and to be discharged downwardly either to a suitable receptacle or, as shown, to a conveyor screw 87 disposed in a suitable trough 88 for conveyance to a suitable treatment means as described above.

Figure 5:
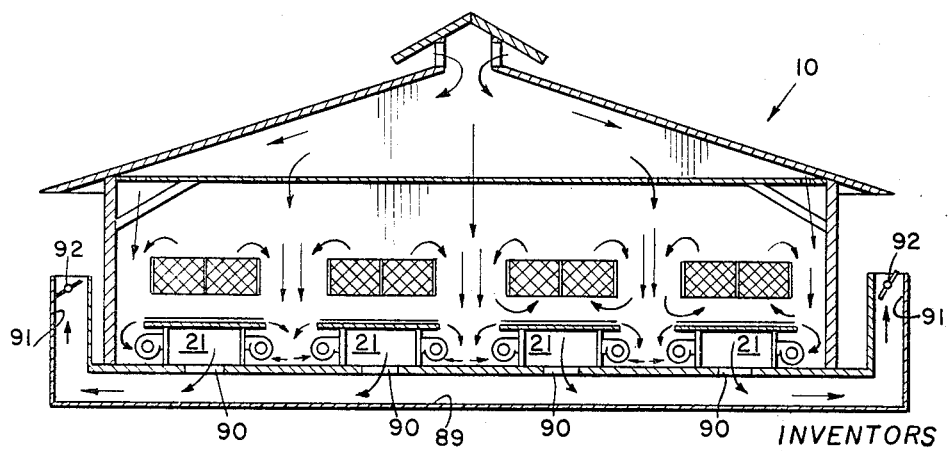
FIG. 5 is a view similar to FIG. 2 but illustrating a simplified installation.
Figure 6:
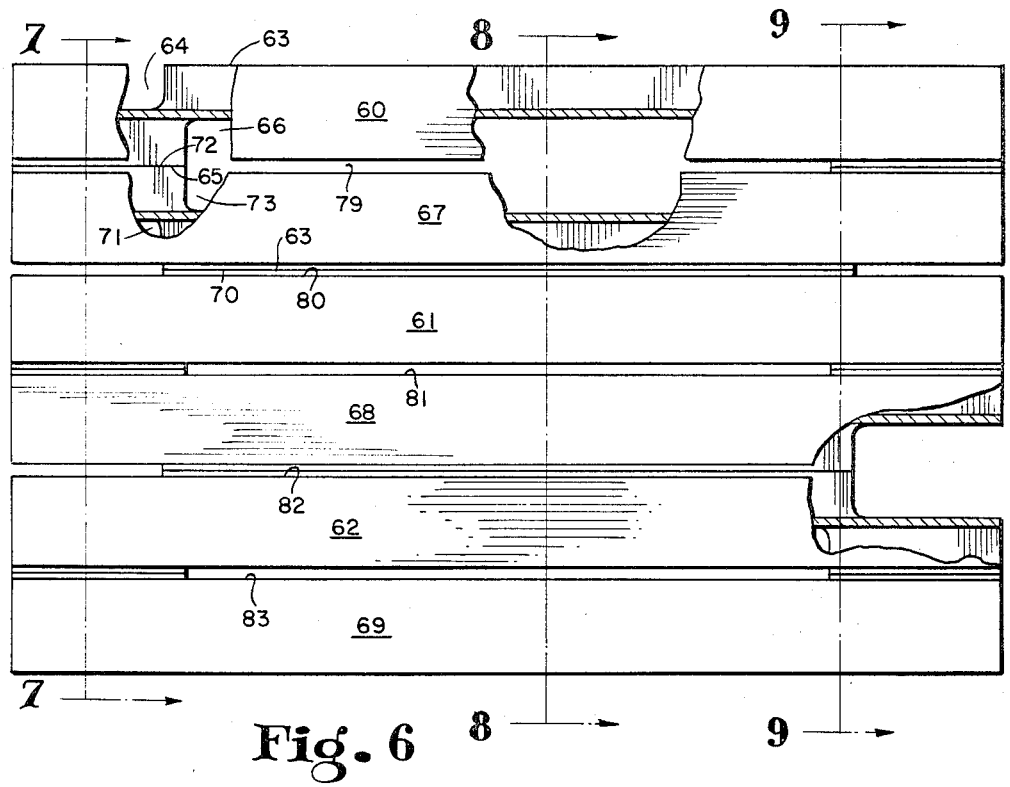
FIG. 6 is an enlarged, fragmentary plan view of a preferred form of pressure chamber roof construction, parts being broken away for clarity of illustration.
Figure 7:
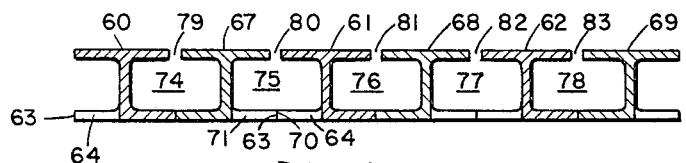
FIG. 7 is a longitudinal section taken substantially on the line 7—7 of FIG. 6.
Figure 8:
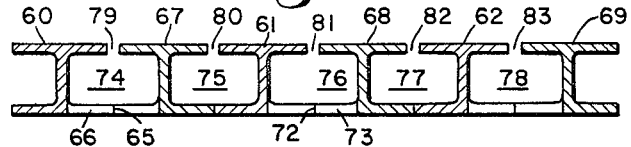
FIG. 8 is a similar section taken on the line 8—8.
Figure 9:
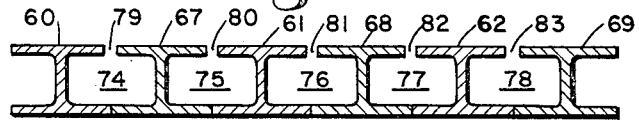
FIG. 9 is a similar section taken on the line 9—9.
Figure 10:
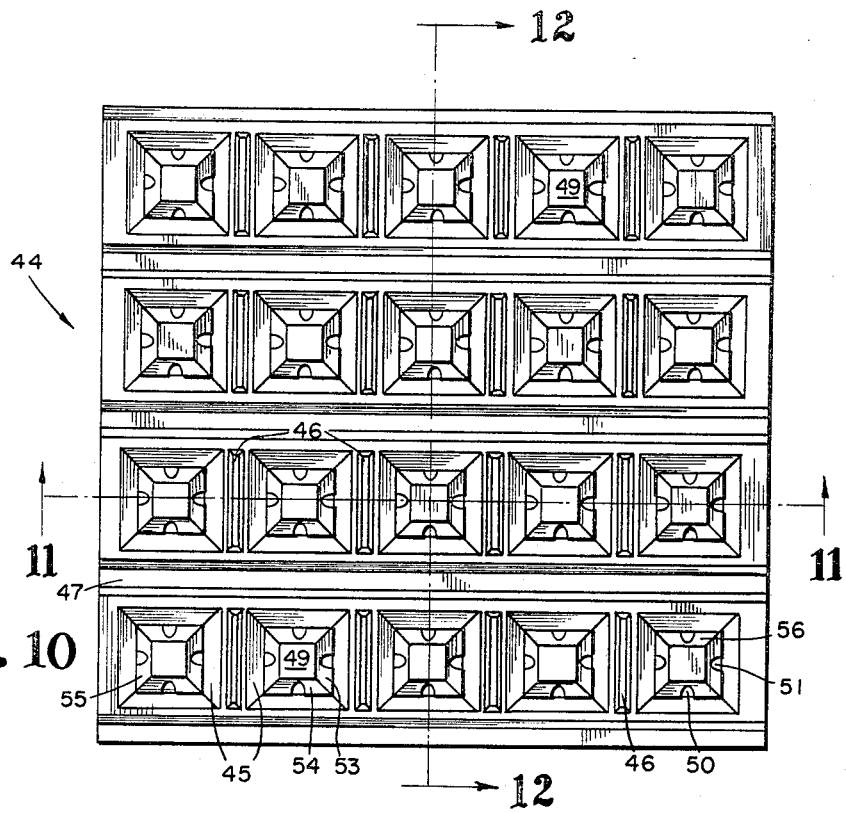
FIG. 10 is a plan view of a section of a modified chamber roof structure illustrating preferred details.
Figure 11:
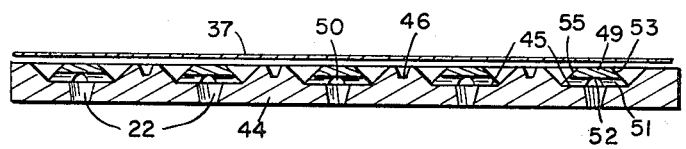
FIG. 11 is a section taken substantially on the line 11—11 of FIG. 10.
Figure 12:
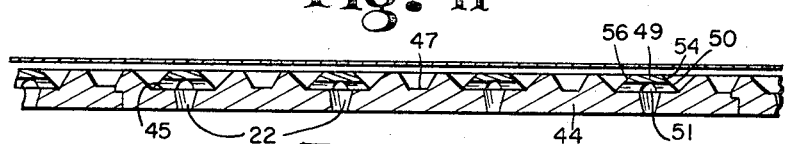
FIG. 12 is a fragmentary section taken substantially on the line 12—12 of FIG. 10.
Figure 13:
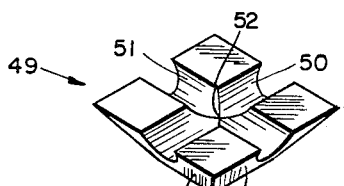
FIG. 13 is an inverted, perspective illustration of a diffuser block.

As is suggested in FIG. 5, an alternative installation may eliminate the walls 25 and 26 which establish the auxiliary chambers 27 and 28, in which case the blowers 33 and 34 will draw their air supply from, and cavities 75, 77 etc. will discharge to, the circumambient atmosphere in the house 10. In such an installation, it may be desirable to provide one or more cross ducts 89 below the chambers 21, communicating with said chambers through ports 90 and leading to one or more vent stacks 91 provided with flow control valves 92. In such an installation, control of the inlet ports 11 may be unnecessary.

In FIGS. 10 to 13, we have illustrated an alternative form of roof means 19 comprising a plurality of pre-cast slabs 44, suitably fitted together to define a roof for each chamber 21. As shown, each such slab is formed in its upper surface with a plurality of depressions 45 each symmetrically surrounding one of a multiplicity of upwardly-flared perforations 22, such perforations being uniformly distributed over the roof surface and opening from the chamber 21 to the region between the roof top and the lower surface of the strip 37. Equalizer channels 46 run transversely between longitudinally-adjacent depressions 45, and equalizer channels 47 run continuously longitudinally between laterally adjacent depressions 45. In each depression is received, preferably loosely, a blast-diffusing block 49. Each such block is preferably frusto-pyramidal and is formed in its plane bottom surface with cross grooves 50 and 51 which intersect at a mid-point 52 in registry with the associated perforation 22, said grooves opening, respectively, through the side walls 53, 54, 55 and 56 of the block. This arrangement spreads the effect of the air cushion upon the strip 37 to equalize its support of the strip.

We claim as our invention:

1. The combination with a bank of cage means arranged in a linear series and supported above means providing a chamber, each cage having a foraminous floor for passage of animal droppings and said chamber having a top member formed with a plurality of openings therethrough, an elongated strip of air-resistant, flexible material directly overlying said chamber top member and spanning substantially all of said openings, means for delivering air to said chamber to maintain a superatmospheric pressure therein whereby air escaping through said top member openings will support said strip substantially out of contact with said top member, and means for unidirectionally moving said strip serially below and past said cages to receive droppings thereon.

2. The combination of claim 1 including means located beyond said moving means to comminute said strip and droppings deposited thereon, said moving means being effective to feed said strip, after said strip has passed all of said cages, to said comminuting means.

3. In combination, means providing an elongated pressure chamber having a top member formed with spaced openings therethrough, cage means having a foraminous floor for the passage of droppings and having openings through its top, said cage means being supported above and in registery with said chamber top member, means arranged adjacent one end of said chamber for supplying a continuous strip of flexible, air-resistant material directly to overlie said chamber top member and receive droppings from said cage means, means spaced longitudinally of said chamber from said supplying means for withdrawing such material from said supply means and moving the same along said chamber top member, and means for delivering air to said chamber to maintain a superatmospheric pressure therein, whereby air escaping through the top member openings supports said strip substantially out of contact with said chamber top member.

4. The combination of claim 3 including means located beyond said material moving means for changing the physical character of said strip and droppings deposited thereon as said strip is fed thereto by said moving means.

5. The combination of claim 3 including a comminuter located beyond said material moving means to receive and act upon said strip and droppings deposited thereon as said strip is fed thereto by said moving means.

6. In an animal house having a controllable air inlet in its uper region, means disposed in a lower region of the house and defining an elongated chamber having a substantially flat top member formed with a multiplicity of openings distributed over its surface, open-work cage means supported above and in registry with said chamber top member, the length of said chamber being at least equal to the length of said cage means and the width of said top member being at least equal to the width of said cage means, means establishing an auxiliary chamber laterally paralleling said first-named chamber, said auxiliary chamber having an inlet adjacent a lateral edge of said top member, blower means arranged in said auxiliary chamber to draw air through said inlet and deliver it to said first-named chamber to maintain a superatmospheric pressure therein, a supply roll of paper having a width approximating that of said top member supported adjacent one end of said first-named chamber, drive means located adjacent the other end of said first-named chamber and constructed and arranged operatively to engage and advance a strip leading from said supply roll and overlying said top member while air emanating through said top member openings impinges on the lower surface of said strip to float the same substantially out of contact with said top member, and treatment means for changing the physical character of said strip and its burden located beyond said strip advancing means, said strip advancing means being effective to feed said strip to said treatment means.

7. The combination of claim 6 including blast-diffusing means guarding the open upper end of each of said top member openings.

8. The combination of claim 6 in which said openings are small perforations uniformly distributed over said top member, and a block for each such perforation, each such block being formed in its lower surface with cross channels intersecting at a point in registry with its associated perforation and opening, at perimetrally-spaced points, through the side walls of said block.

9. The combination of claim 6 in which said top member is constructed of a plurality of formed members so designed as to communicate said superatmospheric air to slots beneath the paper and also communicate air escaping from edge of paper to said second auxiliary chamber.

10. The combination of claim 6 in which said top member openings are transversely-extending slots spaced longitudinally along said top member.

11. The combination of claim 10 in which alternate slots open from said first-named chamber to direct air flow against the lower surface of said strip, while the intermediate slots communicate with said auxiliary chamber.

12. The combination of claim 3 in which said first-named top member openings are transversely-extending slots opening from said chamber to the region between said top member and said strip, said top member being formed with other transversely-extending slots opening from said region and communicating with the circumambient atmosphere.

13. In an animal house having air inlet means and air outlet means, means for controlling the effective flow area of one of said means, means in said house defining an elongated chamber having a substantially flat top member formed with a plurality of transversely-arranged slots spaced longitudinally therealong and opening from said chamber, cage means supported above and in registry with said chamber top member, means establishing an auxiliary chamber laterally paralleling said first-named chamber, said auxiliary chamber having an inlet adjacent a lateral edge of said top member, blower means arranged in said auxiliary chamber to draw air through said inlet and deliver it to said first-named chamber to maintain a superatmospheric pressure therein, a supply roll of paper having a width approximating that of said top member supported adjacent said chamber top member, and drive means located at a point spaced longitudinally of said top member from said supply roll and operatively engageable with a strip of paper from said supply roll to advance such strip relative to said top member while air emanating through said slots impinges on the lower surface of said strip to float the same substantially out of contact with said top member.

14. The animal house of claim 13 in which said drive means includes a vacuum drum engaging the lower surface of said strip.

References Cited

UNITED STATES PATENTS

| 1,719,974 | 7/1929 | Fenner | 119—22 |
| 2,100,508 | 11/1937 | Herbert | 119—22 |
| 2,589,228 | 3/1952 | Cordis | 119—22 X |

FOREIGN PATENTS 652,468    4/1951    Great Britain.

HUGH R. CHAMBLEE, *Primary Examiner.*